(12) United States Patent
Sheldrake et al.

(10) Patent No.: US 7,681,356 B2
(45) Date of Patent: Mar. 23, 2010

(54) IRRIGATION APPARATUS

(75) Inventors: Leonard Frederick Sheldrake, Shailer Park (AU); Craig Mounsey, Toowong (AU); Neil Davidson, Toowong (AU); Mark Gilroy, Toowong (AU); Cambell Smyth, Toowong (AU)

(73) Assignee: Sensitive Flow Systems Pty Ltd, Shailer Park, Queensland (AU)

( * ) Notice: Subject to any disclaimer, the term of this patent is extended or adjusted under 35 U.S.C. 154(b) by 409 days.

(21) Appl. No.: 11/570,492

(22) PCT Filed: Jun. 24, 2005

(86) PCT No.: PCT/AU2005/000934

§ 371 (c)(1),
(2), (4) Date: Dec. 12, 2006

(87) PCT Pub. No.: WO2006/000048

PCT Pub. Date: Jan. 5, 2006

(65) Prior Publication Data

US 2008/0035753 A1    Feb. 14, 2008

(30) Foreign Application Priority Data

Jun. 25, 2004  (AU) .............................. 2004903464
Oct. 29, 2004  (AU) .............................. 2004906232

(51) Int. Cl.
A01G 25/00    (2006.01)
(52) U.S. Cl. .......................................... 47/48.5; 239/63

(58) Field of Classification Search ................ 47/48.5, 47/79, 80, 81; 239/63; 222/187, 422
See application file for complete search history.

(56) References Cited

U.S. PATENT DOCUMENTS

| 1,400,628 | A |   | 12/1921 | Rudolph |
|-----------|---|---|---------|---------|
| 2,458,027 | A | * | 1/1949  | Quist ......................... 401/205 |
| 2,747,332 | A | * | 5/1956  | Morehouse .................... 47/81 |
| 2,799,121 | A | * | 7/1957  | Modeweg ...................... 47/80 |
| 3,786,598 | A |   | 1/1974  | Stadelhofer |
| 4,117,631 | A |   | 10/1978 | Tull |
| 4,124,035 | A |   | 11/1978 | Rice |
| 4,236,352 | A |   | 12/1980 | Heaney et al. |
| 4,324,070 | A |   | 4/1982  | Swisher |
| D278,075  | S | * | 3/1985  | Dryden .......................... D8/1 |
| 4,571,985 | A |   | 2/1986  | Daly |
| 4,634,305 | A |   | 1/1987  | Herrnring |
| 4,708,506 | A |   | 11/1987 | Herrnring |

(Continued)

FOREIGN PATENT DOCUMENTS

AU          61006/69       3/1971

(Continued)

Primary Examiner—Rob Swiatek
Assistant Examiner—Kristen C Hayes
(74) Attorney, Agent, or Firm—Workman Nydegger

(57) ABSTRACT

A method and apparatus (10) for irrigating a plant, the method including the step of placing an end of a fibrous wick (50) in communication with a source of water (21) with the wick (50) delivering the water to a moisture zone proximal to a subterranean root structure of the plant. The deliver of this water is controlled by constricting the wick (50) to a predetermined degree by means of a constriction member (30) in order that the irrigation of the plant is substantially self regulating.

11 Claims, 13 Drawing Sheets

U.S. PATENT DOCUMENTS

| | | | |
|---|---|---|---|
| 4,745,707 A | 5/1988 | Newby | |
| 4,759,857 A | 7/1988 | Acuna | |
| 4,782,627 A * | 11/1988 | Hauk | 47/81 |
| 4,967,207 A | 10/1990 | Ruder | |
| 4,993,186 A | 2/1991 | Immonen | |
| 4,999,947 A * | 3/1991 | Whitaker | 47/81 |
| 5,006,264 A | 4/1991 | Acuna | |
| 5,050,343 A * | 9/1991 | Henttonen | 47/79 |
| 5,097,626 A | 3/1992 | Mordoch | |
| 5,099,609 A | 3/1992 | Yamauchi | |
| 5,129,183 A | 7/1992 | Haw | |
| 5,136,806 A * | 8/1992 | Kang | 47/81 |
| 5,148,628 A | 9/1992 | Wulkowicz | |
| 5,161,407 A | 11/1992 | Ankeny et al. | |
| 5,189,834 A | 3/1993 | Green | |
| 5,207,524 A | 5/1993 | Arnold, III | |
| 5,280,300 A | 1/1994 | Fong et al. | |
| 5,342,136 A | 8/1994 | Fukami | |
| 5,446,994 A * | 9/1995 | Chou | 47/81 |
| 5,518,331 A | 5/1996 | Moosmann et al. | |
| 5,520,248 A | 5/1996 | Sisson et al. | |
| 5,622,004 A | 4/1997 | Gidge | |
| 5,626,431 A | 5/1997 | Hetzer et al. | |
| 5,631,681 A | 5/1997 | Klaus et al. | |
| 5,655,847 A | 8/1997 | Kobayashi et al. | |
| 5,703,633 A | 12/1997 | Gehrer et al. | |
| 5,751,321 A | 5/1998 | Erickson | |
| 5,797,217 A | 8/1998 | Magee | |
| 5,802,818 A | 9/1998 | Doll et al. | |
| 5,806,241 A | 9/1998 | Byland et al. | |
| 5,839,659 A | 11/1998 | Murray | |
| 5,842,309 A | 12/1998 | Skier | |
| 5,861,750 A | 1/1999 | Anderson et al. | |
| 5,917,523 A | 6/1999 | Baldwin et al. | |
| 5,921,025 A | 7/1999 | Smith | |
| 5,929,878 A | 7/1999 | Pelletier | |
| 5,934,017 A | 8/1999 | Ho | |
| 5,956,899 A | 9/1999 | DiOrio | |
| 5,971,532 A | 10/1999 | Toda | |
| 5,984,559 A | 11/1999 | Shiobara et al. | |
| 6,003,982 A | 12/1999 | Curley | |
| 6,023,883 A | 2/2000 | Bacon, Jr. | |
| 6,048,054 A | 4/2000 | Ando et al. | |
| 6,056,463 A | 5/2000 | Nishio et al. | |
| 6,068,422 A | 5/2000 | Smith | |
| 6,079,156 A | 6/2000 | Colovic | |
| 6,116,297 A | 9/2000 | Feygin | |
| 6,161,329 A | 12/2000 | Spelt | |
| 6,164,766 A | 12/2000 | Erickson | |
| 6,178,691 B1 | 1/2001 | Caron et al. | |
| 6,178,984 B1 | 1/2001 | Amsellem | |
| 6,205,706 B1 | 3/2001 | Buss | |
| 6,209,258 B1 | 4/2001 | Schneider | |
| 6,219,969 B1 | 4/2001 | Dion | |
| 6,226,921 B1 | 5/2001 | Kang | |
| 6,237,283 B1 | 5/2001 | Nalbandian et al. | |
| 6,238,042 B1 | 5/2001 | Kobayashi et al. | |
| 6,766,817 B2 | 7/2004 | da Silva | |
| 6,918,404 B2 | 7/2005 | da Silva | |
| 7,066,586 B2 | 6/2006 | da Silva | |

FOREIGN PATENT DOCUMENTS

| | | |
|---|---|---|
| BE | 0892617 A | 9/1982 |
| EP | 0692186 | 1/1996 |
| EP | 1095779 | 5/2001 |
| FR | 2 576 177 | 7/1986 |
| GB | 2 315 396 A | 2/1998 |
| JP | 2000-152721 | 6/2000 |
| WO | WO 90/00347 | 1/1990 |
| WO | WO 99/51079 | 10/1999 |
| WO | WO 00/69251 | 11/2000 |

\* cited by examiner

IRRIGATION APPARATUS

FIELD OF THE INVENTION

This invention relates to an irrigation apparatus. In particular, the invention relates to an irrigation apparatus for large scale irrigation operations for commercial crops. However, it is envisaged that the irrigation apparatus may be used in potted plants in domestic situations.

BACKGROUND OF THE INVENTION

Effective large scale irrigation of commercial crops is desirable in order to provide appropriate supply of water to these crops in a manner that requires minimal maintenance. Additionally, the precise supply of water to these crops whereby the crops receive an adequate amount of water sufficient for growth without receiving an over supply of water is desirable from an economic view point in environments where the supply of water is limited.

Furthermore, a very popular way of home gardening in today's world is through the use of potted plants. Pots provide the ability for people to enjoy gardening without having an actual garden. A problem that is faced by people when they leave their home for holidays and business is the care of their pot plants. Pot plants required regular watering or the plant will perish.

Ideally, the supply of water to a plant is controlled in order that the water is supplied at the same rate that it is consumed by the plant. Furthermore, the water should be ideally supplied at a rate that compensates for the non-uniform consumption of water by the plant over the course of a day and indeed over differing seasons. Additionally, different soil types have different flow characteristics. As such, the supply of water to plants located in different soil type should, ideally, be supplied in a manner that compensates for these flow characteristics in order to achieve an ideal supply of water to the plant.

If a plant is supplied with water in excess of the plants requirements, the plant may be subject to disease and, for larger trees, the excessive moisture in the ground may result in an instability possibly causing the tree to fall. Furthermore, over supply of water is inefficient and, in areas of drought and the like, potentially expensive.

If a plant is supplied with an inadequate level of water, growth is obviously inhibited. Furthermore, if the supply of water cycles between over supply and inadequate supply, the optimal growth of the tree is inhibited.

Various devices have been provided in the art to facilitate the supply of water to plants.

GB 2315396 describes a device for watering a plant having a refillable water reservoir and a pipe in liquid communication with the water reservoir. The pipe has perforations that facilitate the flow of water from the pipe to soil surrounding the pipe. Unfortunately, the perforations in this device are susceptible to being clogged with dirt particles. Thus, the perforations may, over time, become completely sealed and hence ineffective at facilitating liquid flow from the pipe to the ground.

U.S. Pat. No. 5,148,628 describes an irrigation and percolation apparatus having a liquid-filled wall of flexible elongated tubing, the tubing optionally having perforations. The tubing is used as a reservoir wall around the base of a plant and water passes through the perforations to keep the soil moist at the base of the plant. Again, the perforations in this device are susceptible to being clogged with dirt particles.

U.S. Pat. No. 6,023,883 describes a drip irrigator having a flexible hose, a fill neck and at least one percolation opening in the bottom of the flexible hose to transmit the water from the hose to the roots of a tree. Yet again, the percolation openings can potentially become sealed with particles of dirt.

FR 2,576,177 describes a device for watering a potted plant having a flexible reservoir for containing water and a plurality of rigid porous members protruding downwardly from the reservoir and in liquid communication with the water in the reservoir. The rigid porous members are constructed from a ceramic material. The device is inconvenient to install as a hole needs to be dug for each rigid porous member. Further, rigid porous members are susceptible to breakage.

U.S. Pat. No. 4,117,631 describes a watering device having a formable container arranged in and conforming to a lower part of a pot, an elongated substantially vertically extending tubular neck and a wick extending from the container.

WO 90/00347 discloses an apparatus for irrigation comprising a tubular reservoir, an inlet pipe and one or more water soaking feet. The soaking feet optionally contain wicks for soaking and transmitting water from the tube to earth above the soaking feet. The tubular reservoir forming a closed loop and the wicks only soaking water above the tube resulting in inefficient flow of liquid. Additionally, the wicks are inserted into pre-manufactured hole and hence the wicks may only be fitted to the tube at these pre-manufactured hole locations.

AU 61006/69 discloses an apparatus for conveying water to a plant having a pipe, a means for connection to a water supply and a plurality of apertures in the pipe. Each aperture has a length of cord tightly fitted therein for conducting water from within the pipe and along the length of the cord to the roots. The cord passes through one aperture to within the pipe and exits out through a second aperture diametrically opposite the first aperture. As the diametrically opposite apertures are positioned halfway up the pipe there may be a situation where the cord within the pipe is not in contact with water and hence not able to effectively disperse water to the soil surrounding the pipe. Furthermore, the apparatus disclosed in AU 61006/69 provides for an uncontrolled dispersion of water to the soil.

A second embodiment is disclosed in AU 61006/69 wherein a circular container is positioned around a plant. The circular container contains liquid and has apertures in the bottom through which lengths of cord are fitted to feed the roots of the plant. The plant grows through a central tube in the container. Hence, the plant is not able to be moved if it grows too large for the central tube.

The above prior art irrigation apparatus are deficient in that they provided an uncontrolled supply of water to plants. This uncontrolled supply of water generally leads to cycling whereby the plant cyclically receives an over supply of water and an undersupply of water.

OBJECT OF THE INVENTION

It is an object of the invention to overcome or alleviate one or more of the above disadvantages and/or to provide the consumer with a useful or commercial choice.

SUMMARY OF THE INVENTION

In one form, although not necessarily the broadest or only form, the invention resides in a method for irrigation of plants, said method including the steps of:

locating a feed end of an elongate fibrous wick in direct fluid communication with a source of water, said wick in use delivering water, via capillary action in a delivery region of predetermined length comprising substantially a remaining portion of said wick, to a moisture zone proximal a subterranean root structure of a plant, said moisture zone surrounding said delivery region of said wick; and precisely controlling delivery of water to said moisture zone by radially compressing said wick with a flow control mechanism, directly between said feed end and said delivery region, to a predetermined degree such that irrigation of a plant is substantially self regulating, whereby moisture removed from said moisture zone by said plant and ambient weather conditions is replenished by a capillary water delivery via said delivery region of said wick.

In a further form, the invention resides in a plant irrigation apparatus comprising:

a water conduit, said conduit in use containing a supply of water; and a plurality of flow control members in direct fluid communication with said conduit, each said flow control member having:

an elongate fibrous wick extending through an orifice in said flow control member and having a feed end thereof in direct fluid communication with said supply of water; and a control mechanism for selectively radially compressing a portion of said wick;

wherein, water is delivered at a precise predetermined rate via said wick by a capillary action in a delivery region of said wick of a predetermined length comprising substantially a remaining portion of said wick, to a moisture zone proximal a subterranean root structure of said plant, said moisture zone surrounding said delivery region of said wick, in response to removal of moisture from said moisture zone by said plant and ambient weather conditions, whereby irrigation of said plant is substantially self regulating.

Further features of the present invention will become apparent from the following detailed description.

BRIEF DESCRIPTION OF THE DRAWINGS

An embodiment of the invention, by way of example only, will now be described with reference to the accompanying drawings in which.

DETAILED DESCRIPTION OF THE PREFERRED EMBODIMENT

Figure 1:
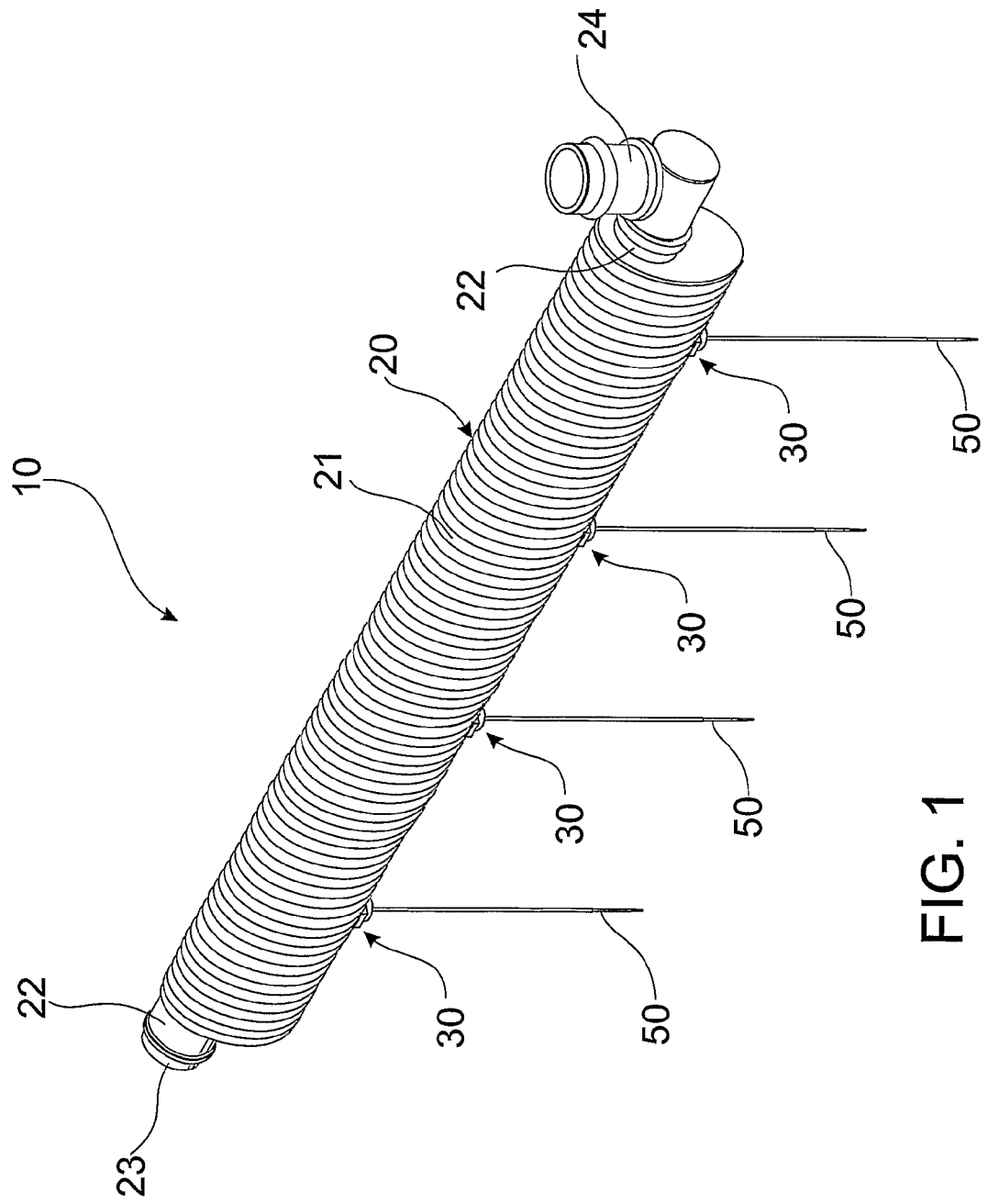
FIG. 1 is a perspective view of the irrigation apparatus according to an embodiment of the invention.
Figure 2:
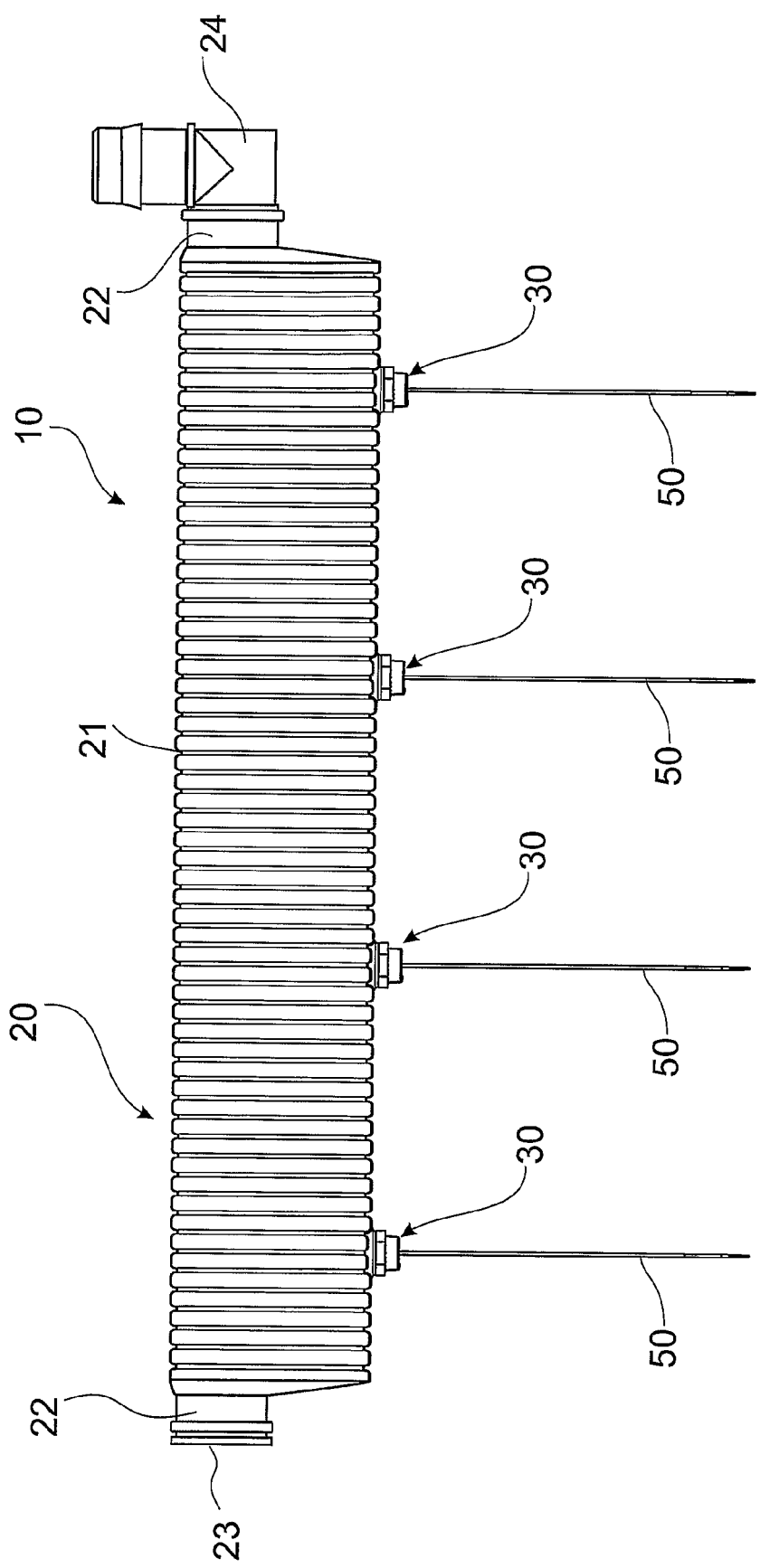
FIG. 2 is a front view of the irrigation apparatus of FIG. 1.
Figure 3:
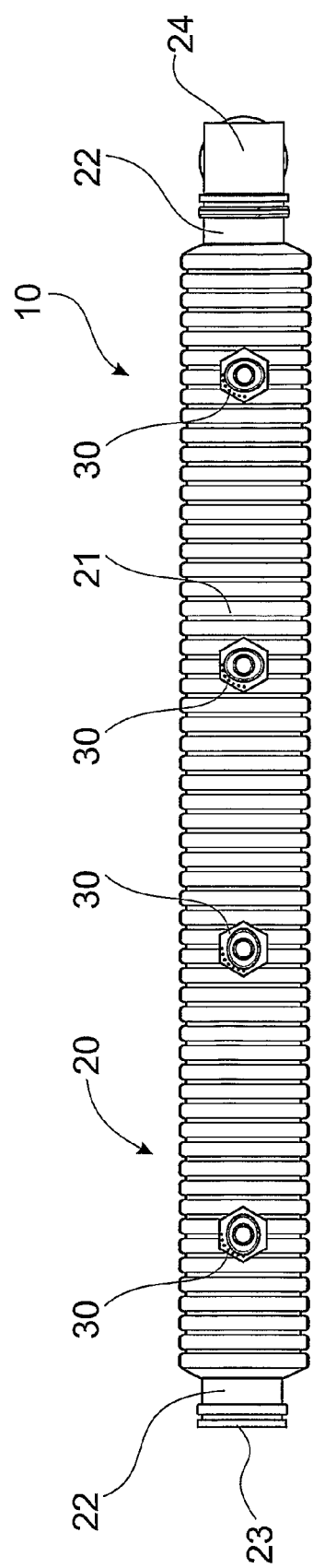
FIG. 3 is a bottom view of the irrigation apparatus of FIG. 1.
Figure 4:
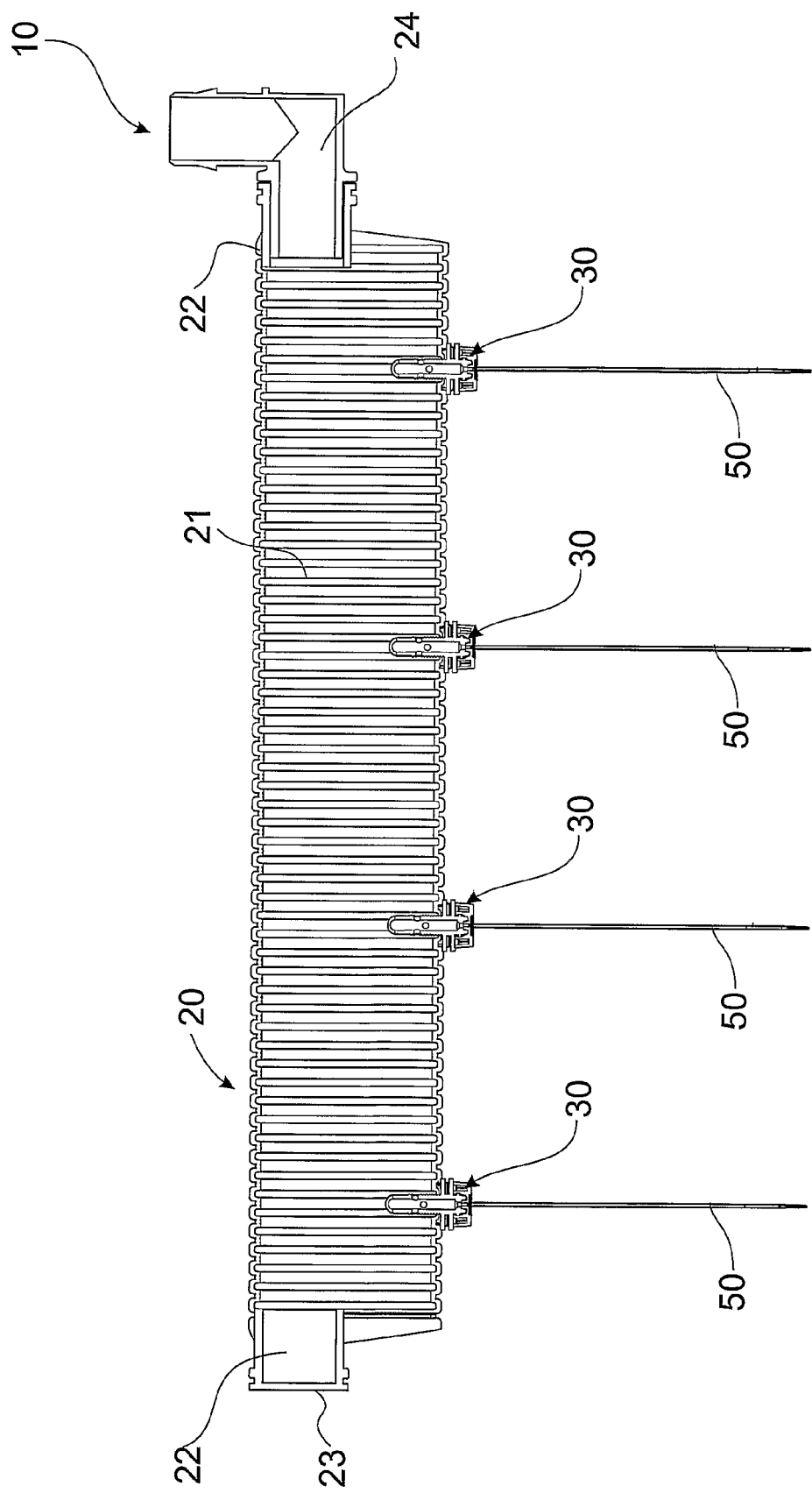
FIG. 4 is a front section view of the irrigation apparatus of FIG. 1.
Figure 6:
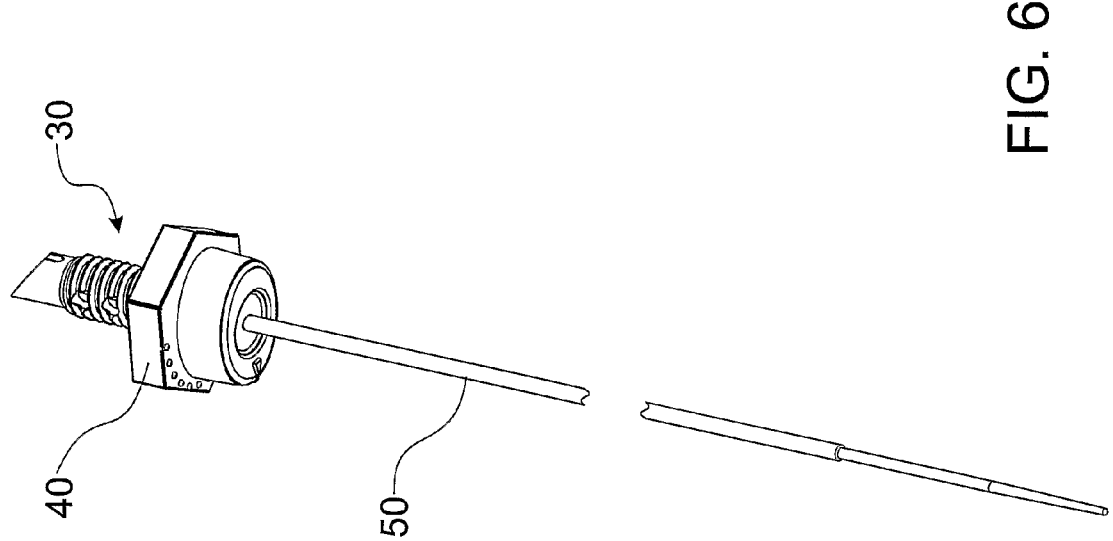
FIG. 6 is a perspective view of an embodiment of a flow control member forming part of the irrigation apparatus shown in FIG. 1.
Figure 5:
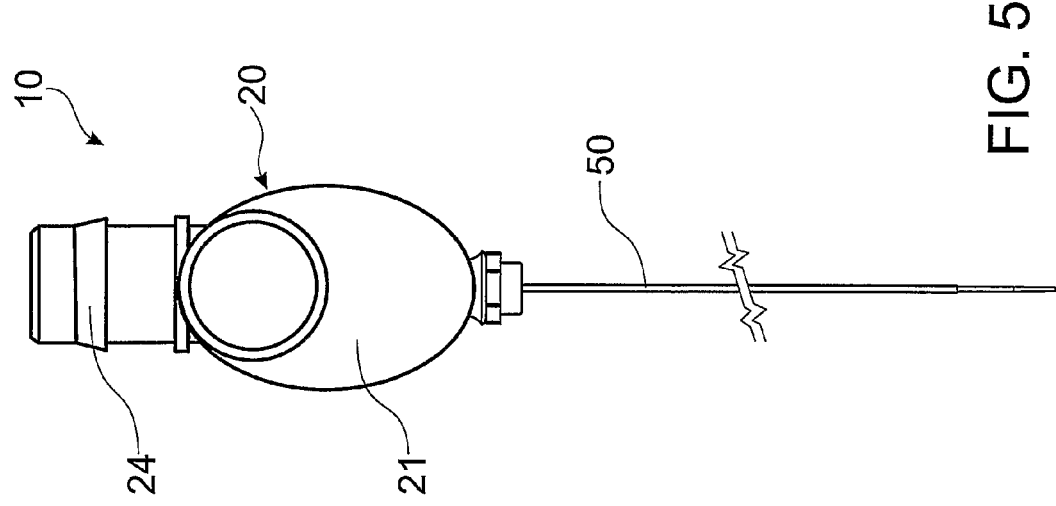
FIG. 5 is a side view of the irrigation apparatus of FIG. 1.
Figure 7:
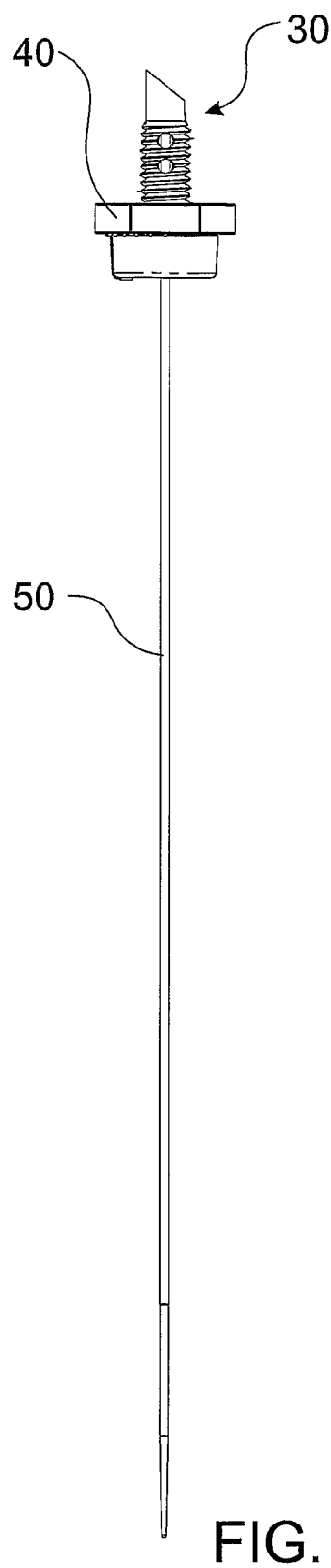
FIG. 7 is a front view of the flow control member of FIG. 6.
Figure 8:
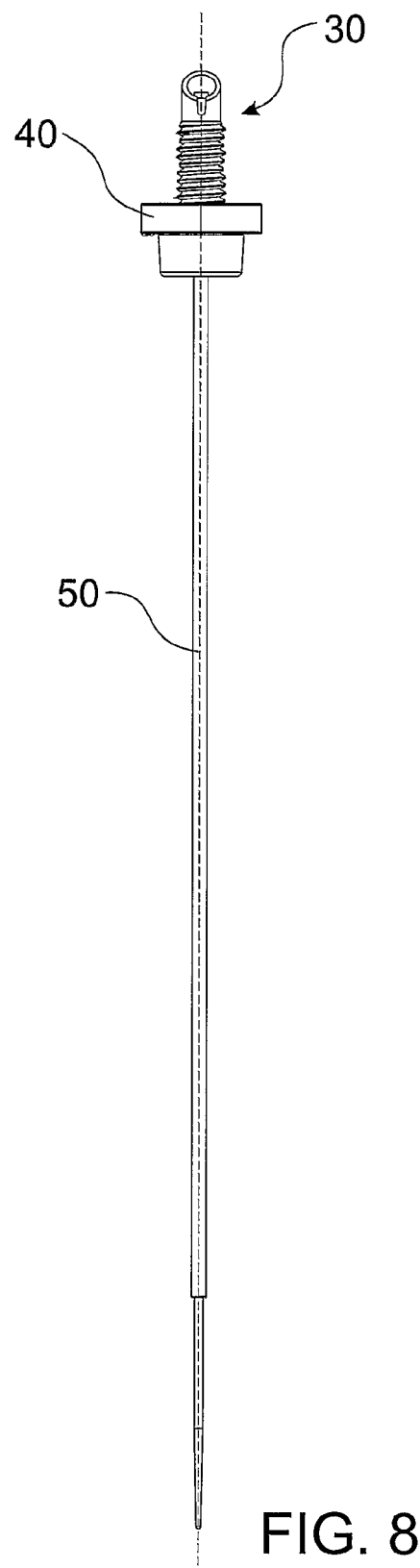
FIG. 8 is a side view of the flow control member of FIG. 6.

The irrigation apparatus of the present invention provides for a controlled supply of water to a plant whereby delivery is via capillary action in a wick from a water conduit to moisture zone proximal a subterranean root structure of a plant. The capillary flow rate along the wick is able to be controlled by a control orifice that provides a selectable degree of axial constriction on the wick in order that the amount of water supplied to the plant is equal to the amount of water consumed by the plant and the environment.

Without wishing to be bound by any particular hypothesis, it is believed that the self regulating nature of the irrigation system according to the invention relies on the controlled delivery of water via a capillary action only to a region of soil surrounding the wick wherein the system seeks to achieve an equilibrium state. In the absence of soil around the wick, water will flow by capillary action via the orifice constriction through the wick until it becomes saturated with water at which time capillary flow will cease. When the wick is surrounded by soil, water will permeate the soil by surface tension effects and/or capillary action between soil particles and/or organic matter in the soil. The degree of permeation will vary depending upon the nature of the soil. For example, permeation in sandy soils with low organic content is less than more clay-like soils with a high organic matter content.

By positioning the wicks of the irrigation apparatus in the root zone of a plant, permeated moisture in the root zone will be removed at a progressive rate by the plant via its roots and also via ambient weather conditions. Both the removal rate by plant consumption and ambient conditions will vary on a daily and seasonal basis.

As the wick seeks to reach a saturation level which balances the capillary force delivering water into the wick structure, then selection of wick size and degree of constriction can then be matched to a particular soil type. Depending on the maturity of the plant and its water usage characteristics, a number of wicks may be positioned in the root zone to satisfy peak demand rates. When water usage requirements diminish, such as overnight or during a Winter season, the moisture content in the soil root zone will remain fairly stable and thus the rate of delivery by capillary action will reduce accordingly.

In this manner, the system of the present invention is substantially self regulating and maintains optimal moisture content in the soil in the plant root zone for optimal plant growth. In this way, optimal watering conditions for growth of the plant are provided as the moisture content in the root moisture zone is maintained.

FIGS. 1 to 5 show a first embodiment of an irrigation apparatus 10. The irrigation apparatus 10 is a hollow vessel 20 and includes plurality of flow control members 30 according to an embodiment of the present invention.

The vessel 20 is in the form of a corrugated polypropylene pipe 21. The pipe 21 is dimensionally stable but may be flexible. That is, pipe 21 is able to be bent to an appropriate configuration. For example, the pipe 21 is able to be bent into a curve to fit around a circumference of a plant. The pipe 21 sits on top of ground and may be partially buried within the ground or may be entirely buried within the ground.

Female connection ports 22 are located at either end of the pipe. In this embodiment, a male plug 23 is connected to and covers one connection port 22 with a male L-shaped connector 24 connected to the other connection port 22. The L-shaped connector 24 allows liquid, normally water, to be introduced into the vessel 20. The plug 23 prevents liquid from escaping from the vessel 20.

The female connection ports 22 also allow two or more adjacent irrigation apparatus 10 to be connected in series. A male linking connector (not shown) may be used for this purpose. Two or more irrigation apparatus may be connected together due to the plant being large or to irrigate two or more different plants in a single pot.

A plurality of flow control members 30 are attached to a bottom of the pipe 21. A wick 50 extends through flow control member 30 such that an end of wick 50 is in fluid communication with water contained in vessel 20. Each flow control member 30 controls a capillary flow rate of liquid along wick 50 to be communicated from the vessel 20 to irrigate the ground in a moisture zone proximal a plant or a root structure thereof. In use, the vessel 20 is buried in ground proximal a plant such that wicks 50 extend in the ground from the vessel 20 proximal the plant.

Initially, wicks 50 are dry and hence, as water is first supplied to the vessel 20, each wick 50 draws water from vessel 20 by means of capillary action seeking to saturate the wick and supplies this water to the ground in a zone of moisture proximal the wick 50. The water exiting the wick 50 permeates through the soil by means of capillary action through void spaces in the ground and/or surface tension effects depending upon soil composition. As the soil in this zone of moisture reaches a desired moisture content, the capillary action on the saturated wick 50 is reduced to substantially zero, as the wick reaches a stable equilibrium state when saturated.

When water is consumed by the plant, moisture is removed from the zone of moisture proximal the wick 50. This results in a capillary flow rate along the wick 50 from vessel 20 to the zone of moisture in the region of the roots of a plant.

The capillary flow rate can be adjusted at the flow control member 30 by controlling the level of constriction at the wick 50 to a level that provides that the amount of water provided by the wick 50 to the zone of moisture is substantially the same as the amount of water removed from the moisture zone As such, a desired moisture content is maintained in the zone of moisture by means of the level of constriction exerted on wick 50 by flow control member 30.

The amount of constriction exerted on the wick 50 by the flow control member 30 is set to a level to accommodate for such variables as ground conditions, environmental conditions and the demands of the plant. Once set, the flow control member 30 is self regulating in that it provides a maximum and minimum capillary flow rate along the wick 50 in order to ensure that zone of moisture is maintained at a substantially optimal equilibrium.

Hence, in this way optimal watering conditions for the plants growth are provided as the flow control member 30 of the present invention controls the supply of water to the moisture zone only in response to water being consumed from this moisture zone. Hence, the cycling of the supply of water between over supply and under supply is removed.

FIGS. 6 to 9 show an embodiment of flow control member 30 in detail. Each flow control member comprises a body 40 attached to a wick 50 that extends through the body 40. The wick 50 is made from a synthetic fibre such as polypropylene or polyethylene due to its resistance to deterioration in moist soil conditions. However, it should be appreciated that various other synthetic and natural fibres may be substituted for polypropylene or polyethylene.

Preferably, a larger plait wick construction, such as a 16 plait construction is desirable in order that the wick has a dimensionally stable cross section.

Figures 9, 10:
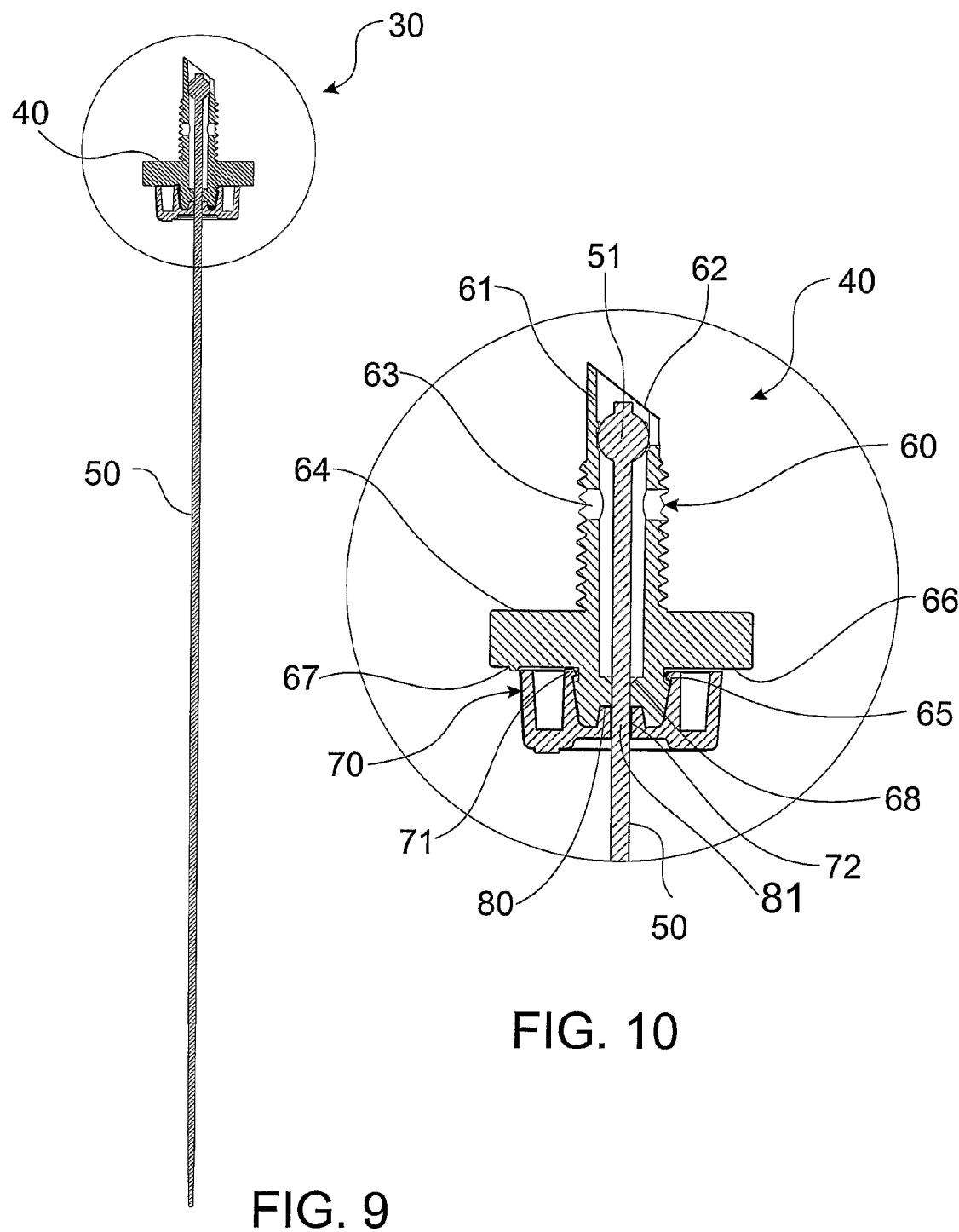
FIG. 9 is a side sectional view of the flow control member of FIG. 6.
FIG. 10 is a detailed view of a top of the flow control member of FIG. 9.
Figure 11:
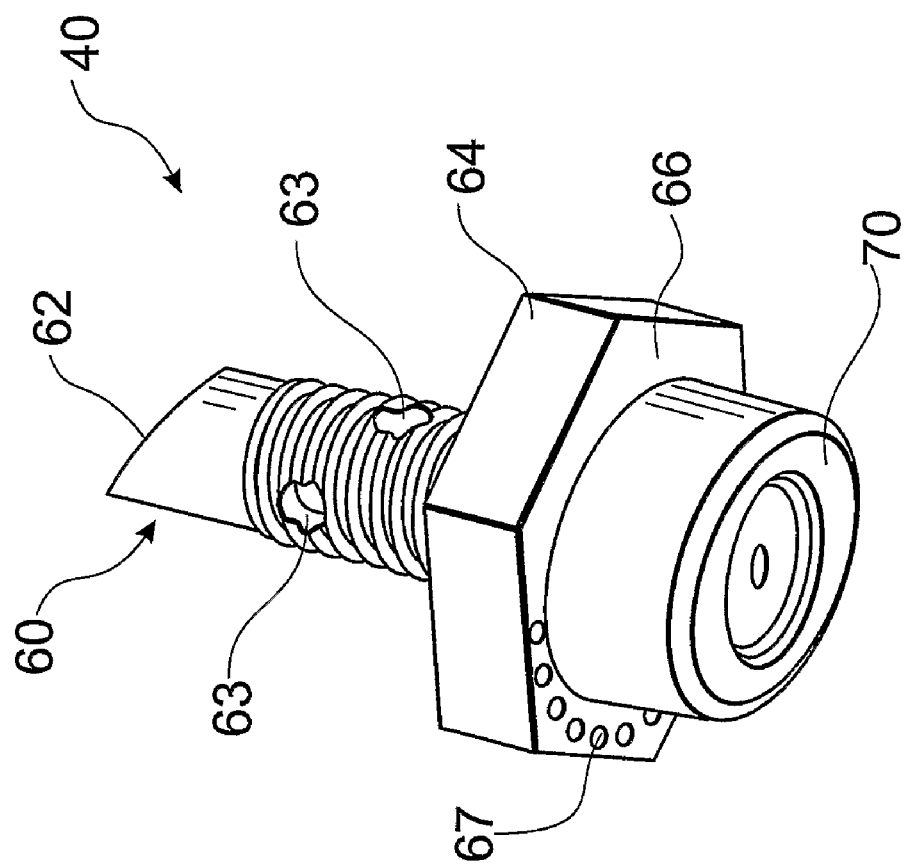
FIG. 11 is a perspective view of the body of the flow control member of FIG. 6.

The body 40, shown in more detail in FIGS. 10 and 11, includes a hollow stem 60 and a rotatable cap 70. A circumferential recess 61 is provided within the stem 60. The wick 50 has an enlarged head portion 51 that fits within the recess 61 to hold the wick within the stem 60.

The stem 60 also has a bevelled end 62 and is threaded on the outside of the stem 60. Holes 63 are located on the stem to allow the ingress of water from the vessel 20 into the stem 60 to contact the wick 50. A stop 64 is provided on the stem 60 to prevent the stem 60 being inserted too far into the vessel 20.

A channel 65 is formed at the end of the stem which is used to attach the rotatable cap 70. An indicator platform 66 having a plurality of indicators 67 located at the bottom of the stem 60. A stem elliptical hole 68 is located through the bottom of the stem through which extends the wick 50.

The rotatable cap 70 has a series of resilient barbs 71 that mount the cap for rotation within the channel of the stem. A cap elliptical hole 72 extends through the cap 70 through which extends the wick 50. The cap elliptical hole 72 is able to be rotated with respect to stem elliptical hole 68 located in the bottom of the stem 60.

Figure 12B:
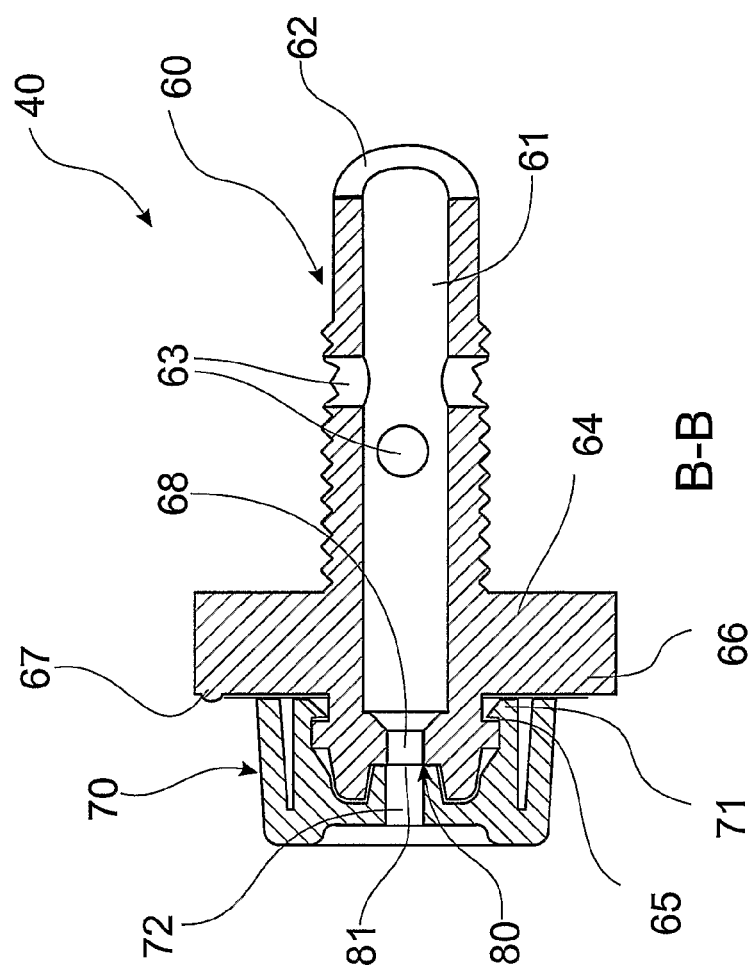
FIG. 12B is a sectional view of a valve of the flow control of FIG. 6 in an open position.
Figure 12A:
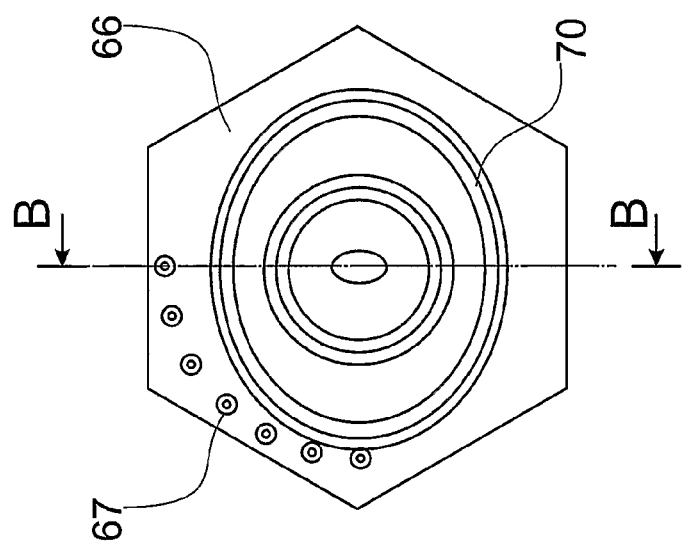
FIG. 12A is a bottom view of a valve of the flow control of FIG. 6 in an open position.

The cap elliptical hole 72 and the stem elliptical hole 68 together form a control mechanism in the form of wick choke valve 80 to constrict a portion of wick 50. The operation of the wick choke valve 80 is shown in FIGS. 12A to 13B. FIGS. 12A and 12B show the wick choke valve 80 in the open position. The cap elliptical hole 72 and the stem elliptical hole 68 are aligned so a wick passageway 81 is formed. In the open position, the largest available cross-sectional area is provided by the wick passageway 81 to allow a maximum amount of fluid to pass through the wick 50 by capillary action.

In this open position, choke valve 80 still constricts a potion of the wick 50 preventing unconstrained fluid flow through wick passageway 81. Hence, all fluid that passes through wick passageway 81 is communicated by wick 50 by means of capillary action.

Figure 13B:
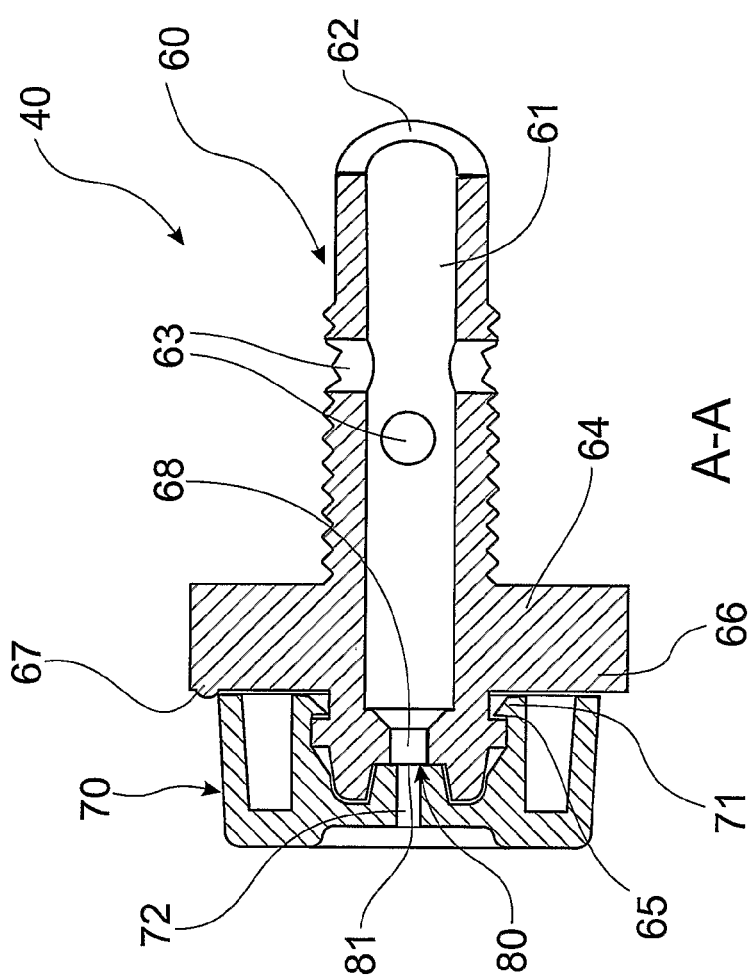
FIG. 13B is a sectional view of a valve of the flow control member of FIG. 6 in a closed position.
Figure 13A:
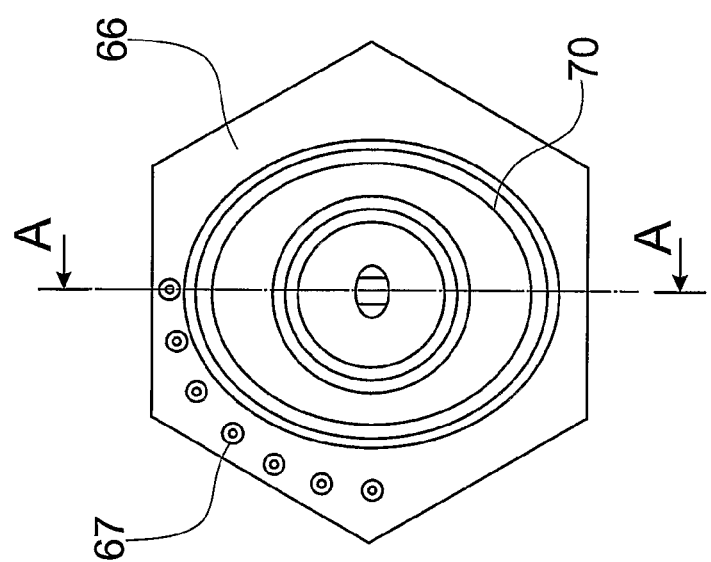
FIG. 13A is a bottom view of a valve of the flow control member of FIG. 6 in a closed position.

FIGS. 13A and 13B show the wick choke valve 80 in a closed position, i.e., a maximum choke position. In the choke position, the cap 70 is rotated through 90 degrees so that the cap elliptical hole 72 and stem elliptical hole 68 are perpendicular with respect to each other. This causes wick passageway 81 to be reduced to its smallest cross-sectional area thereby further constricting the wick 50 by means of capillary action. Hence, the minimum amount of liquid is able to pass through the wick 50. By rotating the cap between 0 degrees to 90 degrees the flow of liquid through the wick can be controlled and hence a desired capillary flow rate may be selected.

As such, wick choke valve 80 is adjustable to vary the amount of constriction on wick 50. The indicators 67 provide an indication as to the amount of constriction the wick constriction member is exerting on the wick 50.

In order to install the irrigation apparatus 10, the flow control members 30 are attached to the bottom of the pipe 21.

A perforation tool (not shown) is used to perforate a hole within the pipe 21 at a desired location. The stem 60 is then inserted within the hole. The bevelled end 62 of the stem 60 assists in the initial placement of the stem within the hole. The stem 60 is pushed into the hole until the thread contacts the hole and the body 40 is then rotated to further cause the stem 60 to be drawn through the hole. The stop 64 and indicator platform 66 are hexagonal in shape so that a spanner can be used to rotate the body 40. The stem is rotated until the stop 60 contacts the pipe 21.

A wick 50 is contained within each flow control member 30 which are positioned through the vessel 20 such that the wicks 50 and flow control members 30 remain in communication with the water should the liquid level be reduced to a minimal retention state.

Once the flow control members 30 are placed within the pipe 21, the cap 70 on each flow control member 30 is rotated to set the amount of liquid that is allowed to flow through the wick 50. The indicator 67 on the indicator platform is used to indicate the amount of choke the choke valve 80 will apply. It should be appreciated that the size of the wick passageway 81, the size of the wick 50 and the material that the wick 50 is constructed from will all contribute to the amount of liquid that flows through the wick 50.

The irrigation apparatus 10 is then placed within the pot plant at the appropriate depth, the appropriate location, and the appropriate configuration.

The vessel 20 is then filled with liquid. A top (not shown) is located over the opening in the L-shaped connector 24 after the vessel is filled so that insects or debris are unable to enter the vessel and cause a blockage of liquid flowing through the flow control members 30.

The irrigation apparatus 10 is thus able to distribute liquid through the ground in a moisture zone proximal to the plant. Capillary action draws liquid from the wicks 50 at a predetermined flow rate determined by the selected constriction on wick 50 by the choke valve 80. Hence, a sustained release can be obtained for a particular type of ground, plant and environment over a reasonably long period of time with the supply of liquid from vessel 20 being substantially the same as the amount of liquid withdrawn from the moisture zone thus achieving substantially optimal watering conditions.

Figure 14:
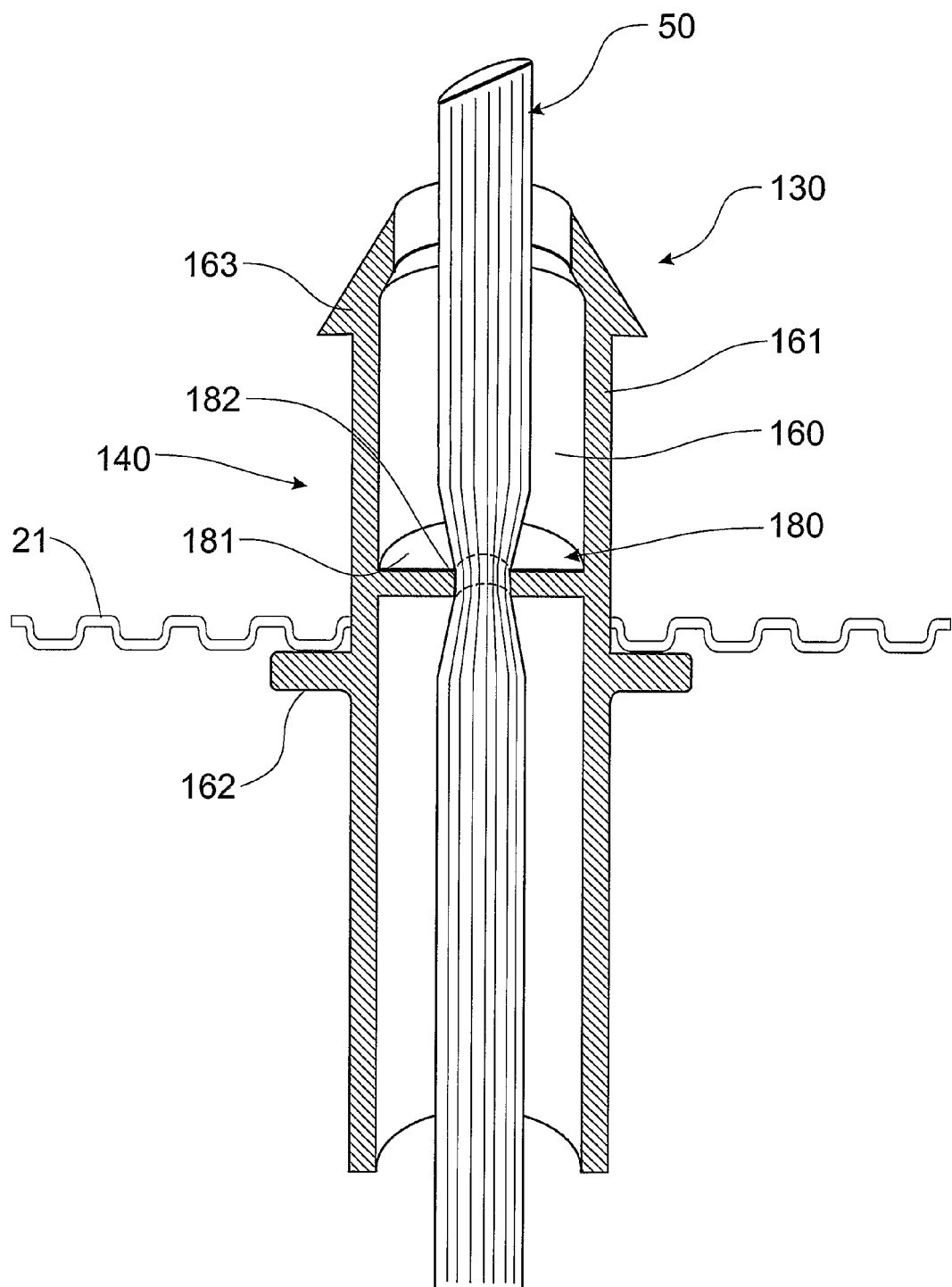
FIG. 14 shows a sectional side view of a further embodiment of a flow control member forming part of the irrigation apparatus shown in FIG. 1.

FIG. 14 shows a sectional view of a flow control member 130 according to a further embodiment of the present invention. Flow control member 130 comprises a body 140 and a wick 50 extending through body 140 as before. The body 140 has a hollow stem 160 and a circumferential recess 161 extending a longitudinal length of hollow stem 160.

Preferably, body 140 has a barbed end member 161 and an abutment member 162 extending outwardly from hollow stem 160.

A throat 180 is located within hollow stem 160. Throat 180 is formed from a plate member 181 having a control mechanism in the form of orifice 182 located at a substantially central portion of plate member 181, the orifice 182 defining a wick passageway.

Wick 50 passes through orifice 182 of throat 180 and is constricted, as described above, at this point.

Flow control member 130 operates in a similar manner as the previous embodiment described above. That is, flow control member 130 is located through a wall of pipe 21 of vessel 20 and communicates liquid contained from within vessel 20 into the ground proximal flow control member 130. Abutment member 162 prevents the total insertion of flow control member 130 into vessel 20 and the barbed end member 161 prevents accidental withdrawal of flow control member 130 from pipe 21.

As wick 50 is constricted by orifice 182 of throat 180, the capillary flow of fluid from vessel 20 through wick 50 is controlled at this point in order to achieve the effect described previously. A series of flow control members 130 are provided having control mechanisms in the form of orifice 182 of differing diameters in order that adjustment of the control mechanism is provided to vary an amount of constriction on the portion of the wick 50 in order that the capillary flow rate along the wick is controlled such that a desired moisture content in a moisture zone proximal the wick 50 is achieved. As such, substantially optimal watering conditions are provided.

A further variation of the present invention is that wicks of differing cross sectional area are provide such that, for a pre-determined control mechanism in the form of orifice 182, a different level of constriction is exerted on each wick on order to control the rate of capillary flow along wick 50 to the moisture zone.

In larger scale commercial irrigation situations, a series of vessels 20 are inter-connected as previously described and are arranged in a manner that facilitates the supply of water to plants as required.

Figure 15:
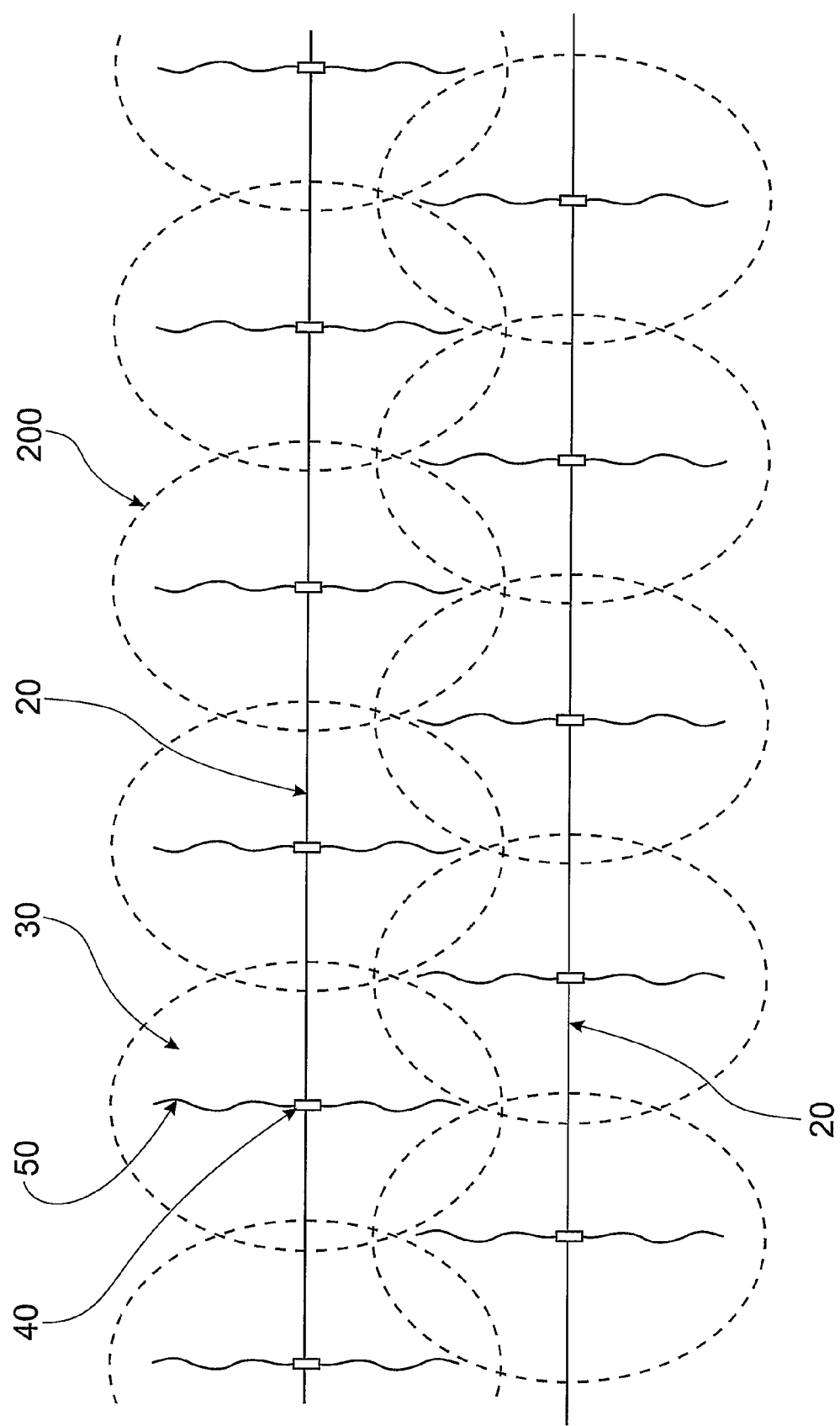
FIG. 15 shows a schematic plan view of an exemplary arrangement of the irrigation apparatus shown in FIG. 1.

FIG. 15 shows a possible arrangement of the irrigation apparatus 10 of the present invention for facilitating supply of water to crops planted in rows. As shown, a series of conduits 20 connected to a reservoir of water (not shown) are arranged substantially parallel to each other intermittent a crop line. A series of flow control members 30 are located in fluid communication with conduit 20 and the wick 50 of each flow control member 30 is arranged such that fluid dispersal occurs proximal the crop. As previously described, each fluid control member 30 has a moisture zone 200 in which it may effectively supply water.

Figure 16:
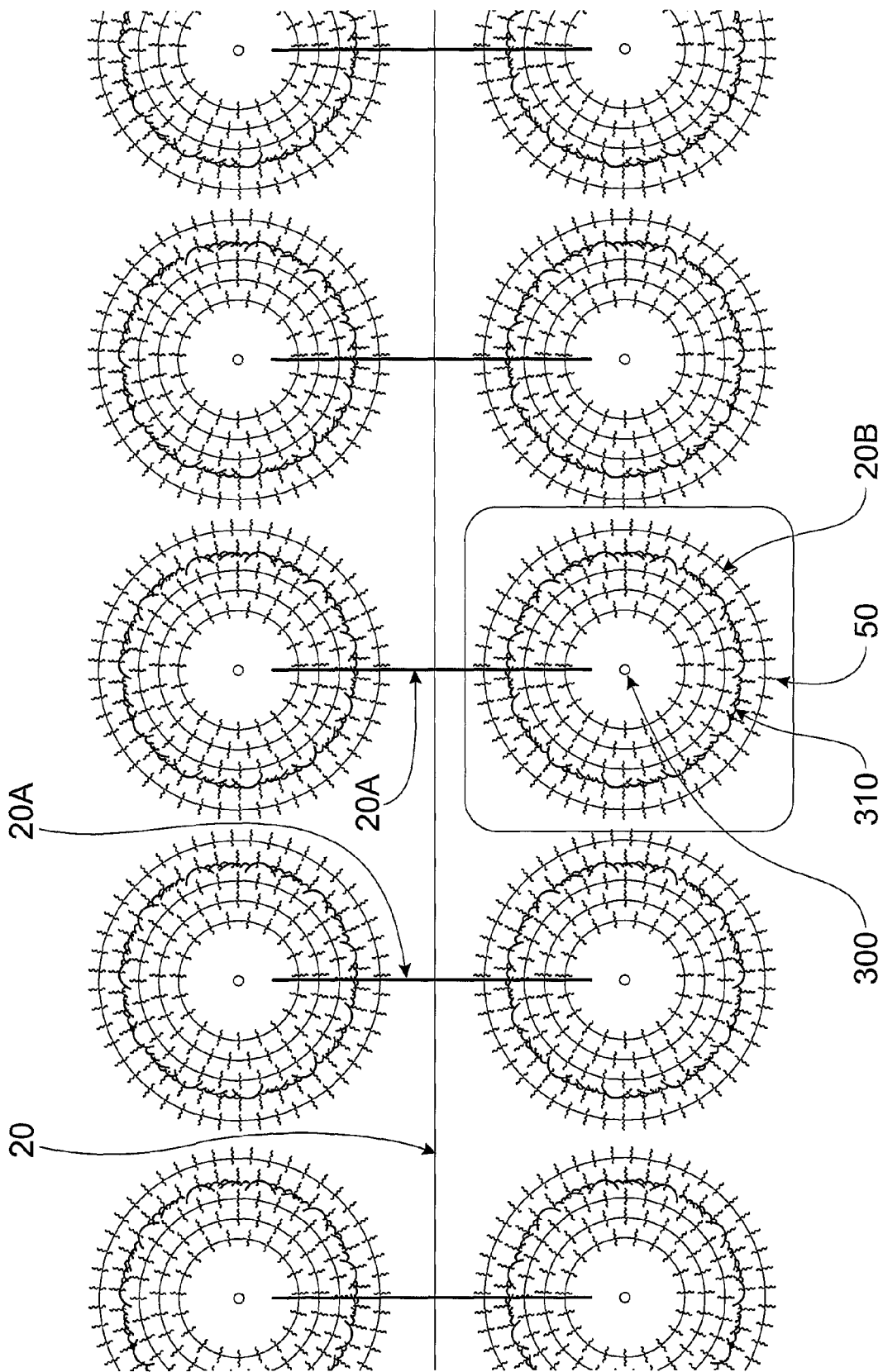
FIG. 16 shows a schematic plan view of another exemplary arrangement of the irrigation apparatus shown in FIG. 1.

FIG. 16 shows a possible arrangement of the irrigation apparatus 10 of the present invention for facilitating supply of water to larger plants 300, such as fruit bearing trees in orchids and the like. As shown, a main conduit line 20 is in fluid communication with conduit sub-lines 20A. Each conduit sub-line 20A has a plurality of circumferential conduit lines 20B at progressive radial distances from plant 300. As the root structure 310 of the plant 300 progressively increases as the plant grows, each subsequent circumferential conduit line 20B may be installed off sub line 20A in order to adequately deliver moisture at a moisture zone proximal root structure 310.

It should be appreciated that the flow control member 30 is not necessarily limited to the configurations described previously. For example, the wick constriction member may be formed using a pair of conical thread jaws and a threaded nut. The nut is screwed onto the threaded jaws. A wick passageway extends between a pair of threaded jaws with the wick extending through the wick passageway.

In an open position, the nut is screwed onto the jaws so that the jaws are in a fully open position. The wick passageway is at the largest available cross-sectional area and hence the maximum amount of liquid to pass through the wick. In a closed position the nut is screwed onto the thread jaws so that the jaws are drawn towards each other. Hence, the cross-sectional area of the wick passageway is at its smallest and choking the wick. At this position the minimum amount of liquid is able to flow through the wick.

In another example, the wick constriction member is in the form of a thread neck and a bolt. At the top of the neck is a recess in which a resilient washer is located. The bolt is screwed upwardly and downwardly along the neck and is able to squeeze the washer. The wick passes through the washer.

The bolt is able to squeeze the washer to reduce an internal diameter of the washer to in turn choke the wick that passes through the washer.

In yet another example, the flow control members may be interchangeable nozzles selected from a range of varying outlet port dimensions but preferably a wick extends from the interior of the vessel via the nozzle outlet port to a surrounding region in the soil. The construction of the wick cord, its fibrous composition and tightness of fit in the nozzle outlet port all can allow a wide variation in fluid flow rates depending upon the nature of the surrounding soil. Similarly, the length of the wick can also have a bearing on the fluid flow rates.

Furthermore, a skilled person will appreciate that whilst the irrigation apparatus of the present invention has been described above having a detachable flow control member 30. Each embodiment of the flow control member may be integrally formed with the vessel 20.

It should be appreciated that the irrigation apparatus of the present invention may be used in low or non-gravity situations.

In a further form, the irrigation apparatus of the present invention may further include a pressure regulation device in situations whereby it is necessary to pressurise vessel 20 to accommodate for undulating terrain and the like. This pressure regulation device provides for a constant pressure at an to the flow control member to ensure that the capillary action along the wick 50 is not disturbed by a pumping pressure force.

It should be appreciated that various other changes and modifications may be made to the embodiment described without departing from the spirit or scope of the invention.

The invention claimed is:

1. A plant irrigation system comprising:
    a water conduit, said conduit in use containing a supply of water; and a plurality of flow control members in direct fluid communication with said conduit, each said flow control member having:
        an elongate fibrous wick extending through an orifice in said flow control member and having a feed end thereof in direct fluid communication with said supply of water; and
        a control mechanism for selectively radially compressing a portion of said wick, the control mechanism including a wick choke valve formed from two corresponding elliptical holes, said corresponding elliptical holes being rotatable relative to each other in order to vary a cross sectional area of a wick passageway defined by said two corresponding elliptical holes;
    wherein, water is delivered at a precise predetermined rate via said wick by a capillary action in a delivery region of said wick of a predetermined length comprising substantially a remaining portion of said wick, to a moisture zone proximal a subterranean root structure of said plant, said moisture zone surrounding said delivery region of said wick, in response to removal of moisture from said moisture zone by said plant and ambient weather conditions, whereby irrigation of said plant is substantially self regulating.

2. The irrigation system according to claim 1, wherein said control mechanism is selected from a plurality of said flow control members having orifices of differing diameters.

3. The irrigation system according to claim 1, wherein said flow control member further comprises a stem having a bevelled end for insertion through a wall of said water conduit.

4. The irrigation system according to claim 1, wherein said flow control member further comprises a barbed end for insertion through a wall of said water conduit.

5. The irrigation system according to claim 1, wherein said flow control member further comprises a stem having a plurality of holes to allow ingress of said water from said conduit to within said flow control member.

6. The irrigation system according to claim 1, wherein said conduit is elongate and said plurality of flow control members are spaced at intervals along a length of said conduit.

7. The irrigation system according to claim 1, wherein said conduit comprises an elongate main conduit and a plurality of sub-conduits branch from said main conduit, each said sub conduit having a said plurality of flow control members spaced at intervals along a length of each said sub-conduit.

8. The irrigation system according to claim 1, wherein said conduit is radially spaced around said plant, said plurality of flow control members being spaced at intervals along a length of said conduit.

9. The irrigation system according to claim 8, wherein a plurality of said conduits are located at radial intervals from said plant.

10. The irrigation apparatus according to claim 1, wherein said water in said conduit is under pressure.

11. A plant irrigation system comprising:
    a vessel bounding a compartment, said compartment being configured to hold water; and
    a flow control member coupled with said vessel, said flow control member comprising:
        a stem coupled with the vessel, the stem bounding a passage extending between an inlet opening and an outlet opening, the inlet opening being in direct fluid communication with said compartment of said vessel, said outlet opening having an elliptical cross section;
        a choke member coupled with said stem adjacent to said outlet opening and having a hole extending therethrough, said hole being rotatable relative to said outlet opening and said hole and said outlet combining to form a wick passageway, said hole being aligned with said outlet opening and having an elliptical cross section so that rotation of said hole relative to said outlet opening varies the cross sectional area of said wick passageway; and
        an elongate fibrous wick partially disposed within said passage and extending through said wick passageway, said wick being constricted within said wick passageway when said hole is rotated relative to said outlet opening.

* * * * *